United States Patent
Barsness et al.

(10) Patent No.: US 8,327,337 B2
(45) Date of Patent: Dec. 4, 2012

(54) STREAM BASED DEBUGGING TECHNIQUES

(75) Inventors: Eric L. Barsness, Pine Island, MN (US);
Ryan K. Cradick, Oronoco, MN (US);
Michael D. Pfeifer, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 12/956,424

(22) Filed: Nov. 30, 2010

(65) Prior Publication Data

US 2012/0137178 A1    May 31, 2012

(51) Int. Cl.
*G06F 9/44* (2006.01)
*G06F 11/00* (2006.01)
(52) U.S. Cl. ........ 717/129; 717/124; 717/127; 714/38.1
(58) Field of Classification Search .......... 717/124–135; 714/37, 38.1
See application file for complete search history.

(56) References Cited

U.S. PATENT DOCUMENTS

| | | | |
|---|---|---|---|
| 2003/0041315 A1* | 2/2003 | Bates et al. | 717/129 |
| 2004/0153818 A1* | 8/2004 | Woodall | 714/37 |
| 2005/0188358 A1* | 8/2005 | Johnson et al. | 717/129 |
| 2006/0048098 A1* | 3/2006 | Gatlin et al. | 717/124 |
| 2007/0261041 A1* | 11/2007 | Amini et al. | 717/148 |
| 2008/0235685 A1* | 9/2008 | Amini et al. | 718/100 |
| 2008/0250390 A1* | 10/2008 | Feblowitz et al. | 717/114 |
| 2009/0158257 A1* | 6/2009 | Xu et al. | 717/129 |
| 2009/0300615 A1* | 12/2009 | Andrade et al. | 718/100 |
| 2010/0325621 A1* | 12/2010 | Andrade et al. | 717/156 |
| 2011/0088016 A1* | 4/2011 | Ball et al. | 717/128 |
| 2011/0161730 A1* | 6/2011 | Van Der Merwe et al. | 714/15 |

OTHER PUBLICATIONS

Gedik et al., "SPADE: The System S Declarative Stream Processing Engine," 2008, ACM, p. 1123-1134.*
Gedik et al., "Tools and strategies for debugging distributed stream processing applications," Oct. 2, 2009, John Wiley & Sons, Ltd., p. 1347-1376.*
Hou et al., "Debugging GPU Stream Programs Through Automatic Dataflow Recording and Visualization," Dec. 2009, ACM, p. 1-11.*
Gedik et al., "Debugging Tools and Strategies for Distributed Stream Processing Applications," 2010, John Wiley & Sons, Ltd., p. 1-28.*

* cited by examiner

*Primary Examiner* — Wei Zhen
*Assistant Examiner* — Qing Chen
(74) *Attorney, Agent, or Firm* — Patterson & Sheridan LLP (57) ABSTRACT

Techniques are described for debugging a processing element (or elements) in a stream based database application in a manner that reduces the impact of debugging the processing element (or elements) on the overall running environment by selectively fusing (or un-fusing) processing elements running on a group of compute nodes. In addition to fusing and un-fusing processing elements or otherwise modifying a state of the stream application, a debugging application and stream manager may modify data flows within the application stream in a variety of ways to minimize any disruption resulting from a debugging session.

18 Claims, 8 Drawing Sheets

STREAM BASED DEBUGGING TECHNIQUES

BACKGROUND

While computer databases have become extremely sophisticated, the computing demands placed on database systems have increased at a rapid pace. Database systems are typically configured to separate the process of storing data from accessing, manipulating or using data stored in the database. More specifically, databases use a model where data is first stored, then indexed, and then queried. However, this model cannot meet the performance requirements of some real-time applications. For example, the rate at which a database system can receive and store incoming data can limit how much data can be processed or otherwise evaluated, which, in turn, limits the utility of database applications configured to process large amounts of data in real-time.

To address this issue, stream based computing and stream based database computing is emerging as a developing technology for database systems. And products are available which allow users to create applications that process and query streaming data before it reaches a database file. With this emerging technology, users can specify processing logic to apply to inbound data records while they are "in flight," with the results available in milliseconds. Constructing an application using this type of processing has opened up a new programming paradigm that will allow for a broad variety of innovative applications, systems and processes to be developed as well as present new challenges for application programmers and database developers.

SUMMARY

Embodiments of the invention provide techniques for debugging a processing element (or elements) in a stream based database application. For example, one embodiment of the invention includes a method of debugging a stream application composed from a plurality of processing elements executing on one or more compute nodes. The method may generally include receiving an indication of a location for a debugging breakpoint in a first one of the plurality of processing elements and evaluating an operator graph to identify a position of the first processing element, relative to one or more other processing elements, of the plurality. This method may also include modifying a state of the stream application to allow the first processing element to be debugged and initiating a debugging session for the first processing element.

Another embodiment of the invention includes a computer-readable storage medium containing a program which, when executed, performs an operation for debugging a stream application composed from a plurality of processing elements executing on one or more compute nodes. The operation itself may generally include receiving an indication of a location for a debugging breakpoint in a first one of the plurality of processing elements and evaluating an operator graph to identify a position of the first processing element, relative to one or more other processing elements, of the plurality. The operation may further include modifying a state of the stream application to allow the first processing element to be debugged and initiating a debugging session for the first processing element.

Still another embodiment of the invention includes a system having a plurality of compute nodes, each including a processor and a memory. The compute nodes are configured to execute processing elements of a stream application. The system may also include a management system also having a processor and a memory. The memory stores a stream debugging application, which, when executed on the management system, is configured to perform an operation for debugging the stream application executing on the plurality of compute nodes.

The operation itself may generally include receiving an indication of a location for a debugging breakpoint in a first one of the plurality of processing elements and evaluating an operator graph to identify a position of the first processing element, relative to one or more other processing elements, of the plurality. The operation may further include modifying a state of the stream application to allow the first processing element to be debugged and initiating a debugging session for the first processing element.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. Note, however, that the appended drawings illustrate only typical embodiments of this invention and are therefore not to be considered limiting of its scope, for the invention may admit to other equally effective embodiments.

DETAILED DESCRIPTION

In a stream application, operators are connected to one another such that data flows from one processing element to the next (e.g., over a TCP/IP socket). Scalability is reached by distributing an application across nodes by creating many small executable pieces of code (operators), as well as replicating processing elements on multiple nodes and load balancing among them. Processing elements (and operators) in a stream application can be fused together to form a larger processing element. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream application, as well as fused or un-fused from a stream application during runtime.

While processing elements in a distributed stream environment may be debugged by reviewing log files generated by running code, frequently a complete debugging session is needed. However, running a debugger slows down a process being debugged, regardless of whether a breakpoint is hit, and triggering a breakpoint can result in a substantial slowdown (if not complete halt) to data flowing through an operator under debug. Thus, running a processing element under debug can cause "stream backup," as data streams flowing to the operators in that processing element do not stop flowing. More generally, stream computing is based on the premise that streams continuously flow through the operators.

When multiple processing elements are fused together to form a single running process, triggering a break point in one causes all of the fused processing elements to stop processing, potentially turning off a large portion of an operator graph. On the other hand, a set of un-fused processing elements may include a first processing element configured to join data streamed from a second and third processing element. If a breakpoint is triggered in either the second or third processing element, the stream processing results can be disrupted.

Embodiments of the invention provide techniques for debugging a processing element (or elements) in a stream based application. In particular, embodiments of the invention provide techniques for modifying a state of the stream application during debugging a processing element in a manner that reduces the impact of debugging the processing element (or elements) on the overall running environment. For example, assume that one operator within a fused processing element of twenty operators needs to be debugged. In such a case, a stream debugger may be configured to remove the fused processing element from the running stream, un-fuse the operators, and re-insert them into the running stream. The processing element with the single operator being debugged may then execute as an independently running process (with its own process ID (PID) and memory space), which allows that operator to be debugged independently from the other nineteen. Once the debugging session is complete, the debugger may re-fuse the un-fused operator, restoring the processing element of twenty fused operators to the same running state that existed prior to debugging session.

In another embodiment, the debugger may fuse multiple independent processing elements together as part of a debugging session. This may be useful to halt a portion of an operator graph from running when one operator is being debugged. For example, doing so may allow any dependencies between processing elements to be satisfied. Similarly, the debugger may in appropriate cases prevent data from flowing into the stream while a given processing element is being debugged. This can occur at any point upstream (or downstream) from a processing element in the operator graph being debugged. More specifically, the debugger may prevent data from flowing to a source operator (i.e., a processing element that is the source point for data flowing through an operator graph) or from flowing to a specific part (or specific processing element) in the operator graph. Conversely, the debugger may be configured to recognize some tuples of incoming data as being exempt from a breakpoint.

As an alternative to preventing data from flowing, data may be "load shed" at a processing element under debug (or selectively allowed to flow under some conditions). Doing so may help avoid overloading the system with data when the debugging session is complete; particularly in cases where data may not have value if not processed promptly. In still another embodiment, the debugger may be configured to duplicate a processing element such that debugging occurs in the duplicated one. Data flowing out of the debugged processing element may be shed instead of being sent to the linked, downstream operators. Further, the results output by the operator under debug may be compared to the real operator as a check on the accuracy of the debugging process.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream database application may be virtual machines hosted by a cloud service provider.

Figure 1A:
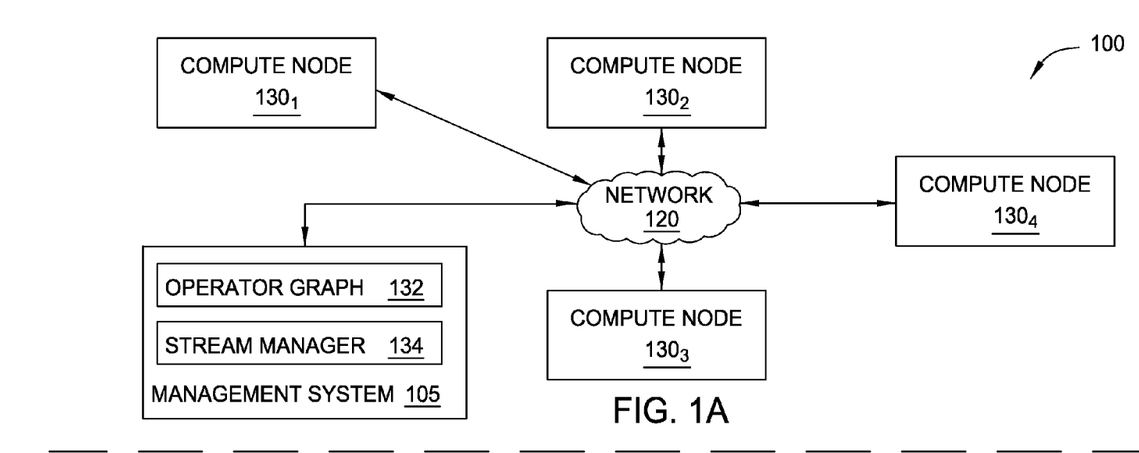
FIGS. 1A-1B illustrate a computing infrastructure configured to execute a stream database application, according to one embodiment of the invention.
Figure 1B:
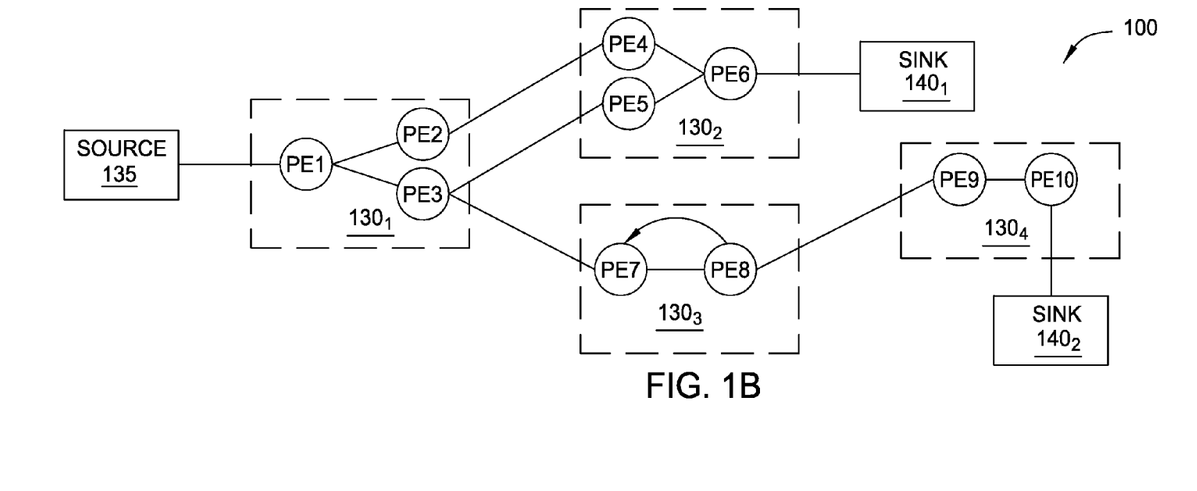

FIGS. 1A-1B illustrate a computing infrastructure 100 configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream application beginning from of one or more source processing elements (PEs) through to one or more sink PEs. Data elements flow into a source PE of a stream application and are processed by that PE. Typically, processing elements receive an N-tuple of data elements from the stream as well as emit an N-tuple of data elements into the stream (except for a sink PE where the stream terminates). Of course, the N-tuple received by a processing element need not be the same N-tuple sent downstream. And the processing elements could be configured to receive or emit data in formats other than an N-tuple (e.g., the processing elements could exchange data marked up as XML documents). Additionally, each processing element may be configured to carry out any form of data processing functions on the received tuple, including, e.g., writing to database tables or performing other database operations such as data joins, splits, reads, etc., as well as performing other data analytic functions or operations.

The stream manager 134 may be configured to monitor a stream application running on the compute nodes $130_{1-4}$ as well as change the structure of the operator graph 132. For example, the stream manager 134 may move processing elements (PEs) from one compute node 130 to another, e.g., to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$.

FIG. 1B illustrates an example operator graph that includes ten processing elements (labeled as PE1-PE10) running on the compute nodes $130_{1-4}$. While a processing element may be executed as an independently running process (with its own process ID (PID) and memory space), multiple processing elements may be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at a source PE 135 (labeled as PE1) and ends at sink PEs $140_{1-2}$ (labeled as PE6 and PE10). Compute node $130_1$ includes source PE1 along with PE2 and PE3. Source PE1 emits tuples received by PE2 and PE3. For example, PE1 may split data elements received in a tuple and pass some data elements to PE2 others to PE3. Data that flows to PE2 results in tuples emitted to PE4 on compute node $130_2$. And data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which emits tuples processed by sink PE10 $140_2$.

Figure 2:
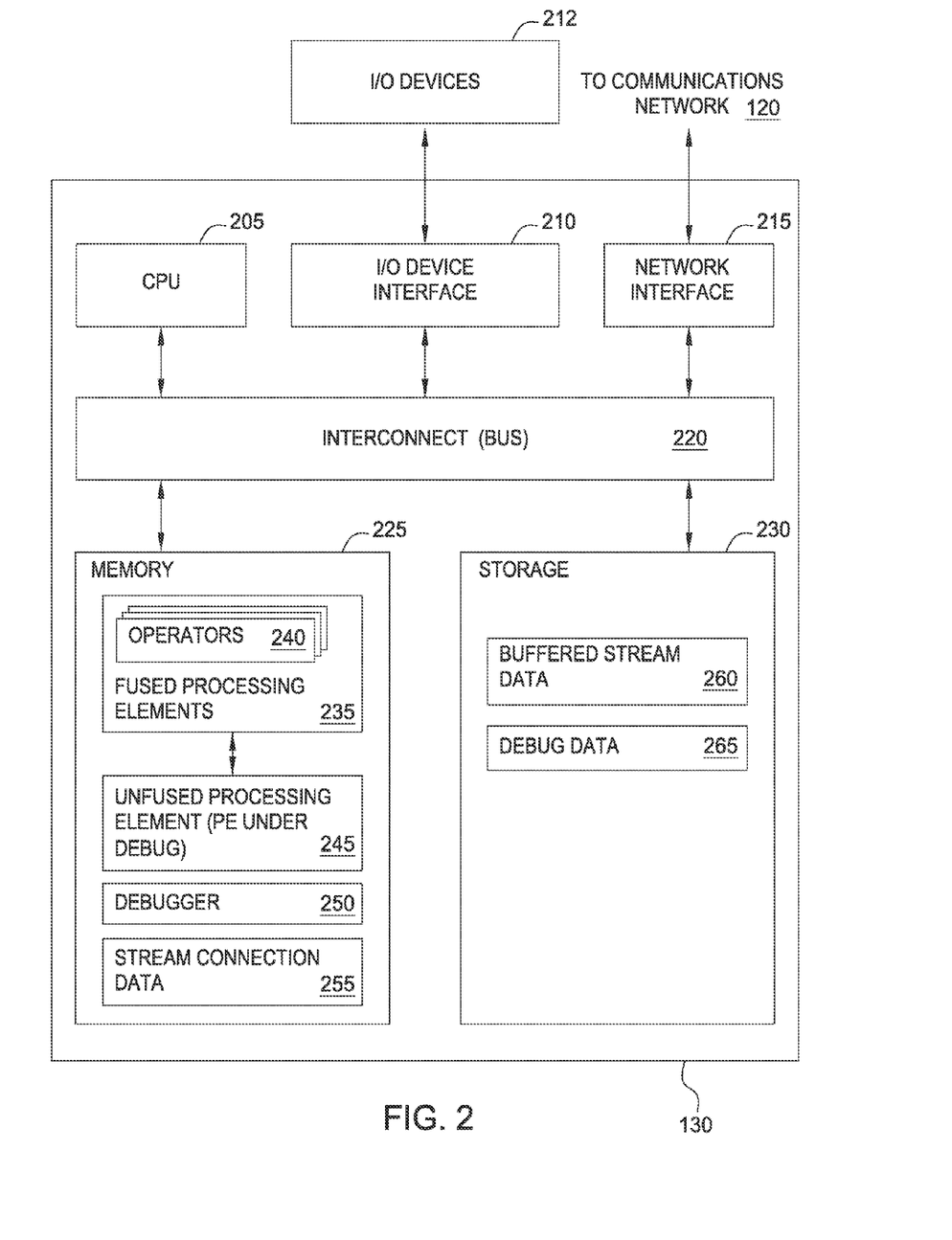
FIG. 2 is a more detailed view of a distributed computing node of FIG. 1, according to one embodiment of the invention.

FIG. 2 is a more detailed view of the compute node 130 of FIGS. 1A-1B, according to one embodiment of the invention. As shown, the compute node 130 includes, without limitation, a central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive, solid state device (SSD), or flash memory storage drive, may store non-volatile data.

In this example, the memory 225 includes a fused processing element (PE) 235, an un-fused PE 245, a debugger application 250, and stream connection data 255. The fused PE 235 includes a collection of operators 240. As noted above, each operator 240 may provide a small chunk of executable code configured to process data flowing into a processing element (e.g., PE 235) and to emit data to other operators 240 in that PE and to other PEs in the stream application. Such PEs may be on the same compute node 130 (e.g., un-fused PE 245) or on other compute nodes accessed over the data communications network 120. The stream connection data 255 represents the connections between PEs on compute node 130 (e.g., a TCP/IP socket connection between the fused PE 235 and un-fused PE 245), as well as connections to other compute nodes 130 with upstream and/or downstream PEs in the stream application, also via TCP/IP sockets (or other inter-process data communication mechanisms).

Storage 230 includes buffered stream data 260 and debug data 265. Buffered stream data 260 represents a storage space for data flowing into the compute node 105 from upstream processing elements (or from a data source for the stream application). For example, buffered stream data may include data tuples waiting to be processed by one of the PEs 235 or 245. Buffered stream data 260 may also store the results of data processing performed by PEs 235 or 245 that will be sent to downstream processing elements (or load shed).

The debugger 250 provides a software application configured to allow a developer to debug processing element 245 running on the compute node 130. For example, the debugger 250 may be used to set breakpoints, to execute instructions step into (or over) function calls in the instructions, to inspect variables, etc., as well as provide a variety of other functions and/or features used for debugging the processing element 245. In context of the present invention, the debugger 250 may be configured to selectively fuse and un-fuse PEs (or otherwise modify a state of the stream application) to facilitate the debugging process. In one embodiment, e.g., the debugger may fuse and un-fuse PEs as specified by the developer. Alternatively, the debugger 250 may be configured to propose a stream state for debugging a given processing element (or elements). To do so, the debugger 250 may interact with a stream debugger on the management system 130 to analyze an operator graph as well as a distribution of processing elements across a collection of compute nodes 105 in order to determine how to modify the operator graph associated with a stream application. In addition to fusing and un-fusing processing elements, the debugger 250 may modify the running state of the stream application by, e.g., halting (or limiting) data flows across a PE being debugged, specifying data exempt from the debugging process, duplicating PEs to create a debug copy of a PE, or performing other actions to allow a processing element (or elements) to be debugged.

Figure 3:
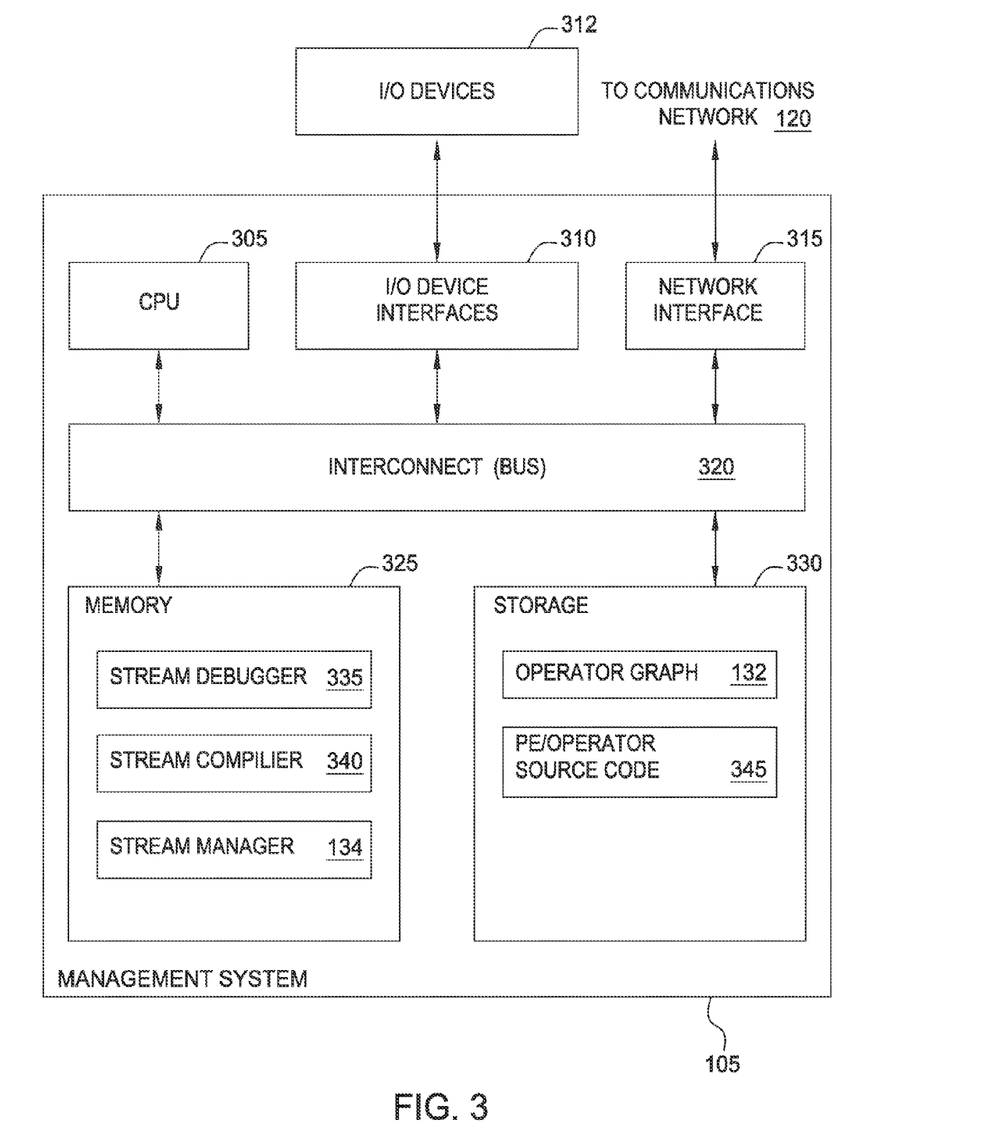
FIG. 3 is a more detailed view of a management computing system in a stream database application, according to one embodiment of the invention.

FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream debugger 335, a stream compiler 300, and a stream manager 134. The storage 330 includes the operator graph 132. As noted above, the stream debugger 335 may be used to manage the debugging of a processing element (PE) on one (or more) of the compute nodes 105. For example, the stream debugger 335 may determine that one processing node should be fused (or un-fused) with other PEs. In such case, the stream debugger 335 could determine (from the operator graph) that a large group of PEs have been fused on one compute node—but that debug breakpoints are included in only few of the processing elements. In such a case, the stream debugger 335 could decide to un-fuse the PEs with the breakpoints from the larger group. In one embodiment, the stream debugger 335 un-fuses the PE by invoking the stream compiler 340 to recompile elements of the PE/operator source code as needed. In the current example, the PEs with breakpoints could be recompiled into a first PE, and the remaining PEs (from the fused PE) are recompiled into a second PE. Once prepared, the stream manager 134 may remove the fused PE from the running stream and replace it with the first PE and the second PE generated by the stream compiler 340. Thereafter, breakpoints in the first PE are hit, the first PE stops executing without disrupting any processing performed by the second PE.

Figure 4:
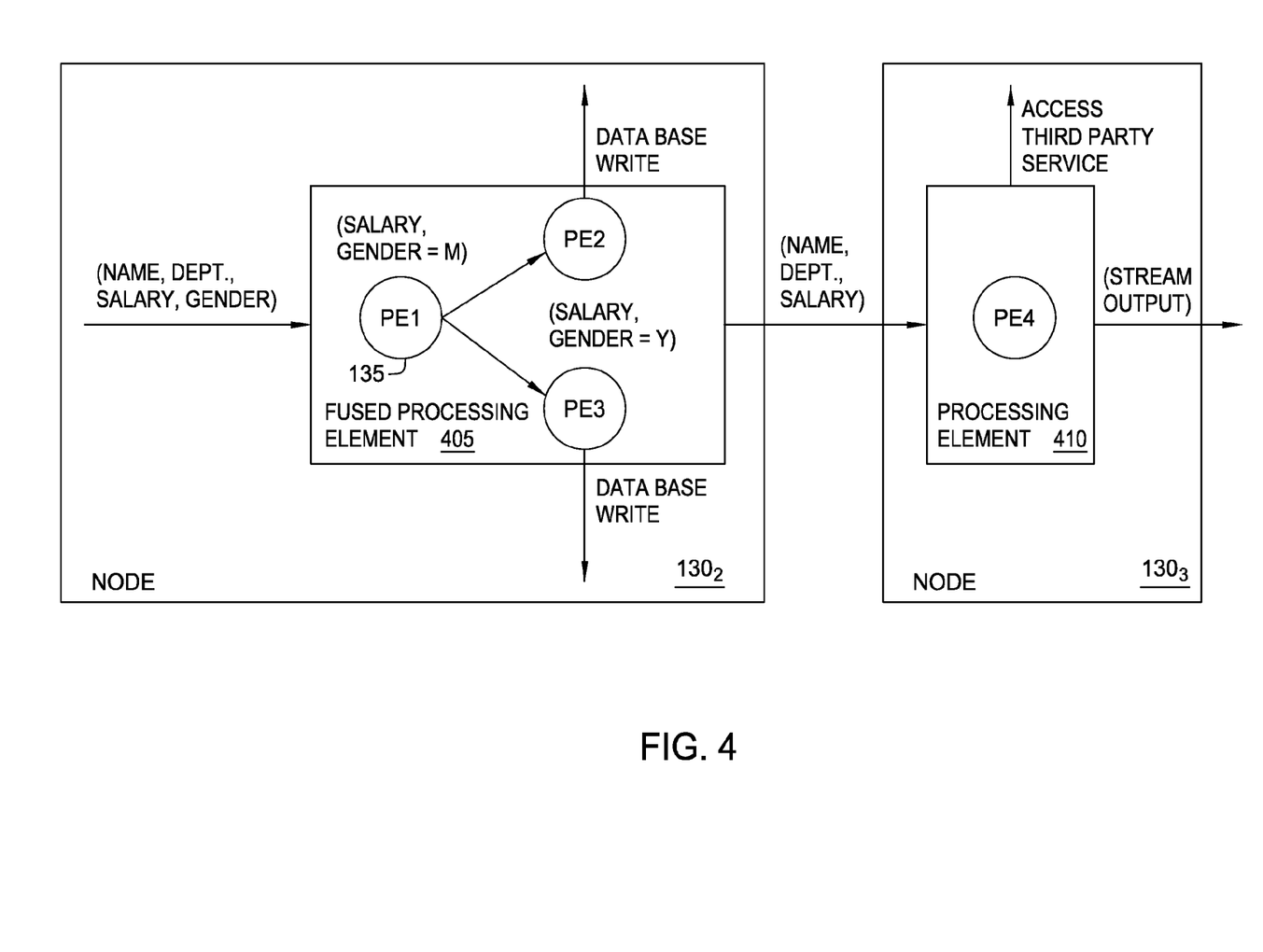
FIG. 4 illustrates an example of compute nodes in a stream database application, according to one embodiment of the invention.

FIG. 4 illustrates an example of compute nodes in a stream application, according to one embodiment of the invention. As shown, a fused processing element 405 on compute node $130_2$ includes three processing elements (labeled PE1-PE3), which receives an N-tuple data stream and emits an N-tuple to a processing element 410 (labeled PE4) on compute node $130_3$. In this example, the fused processing element 405 includes source PE 135 (labeled PE1), which receives a tuple which includes <name, department, salary, gender>. PE1 takes this N-tuple and generates one set of tuples sent to PE2 and another set of tuples sent to PE3, based on the gender value in a tuple received by PE1. In turn, PE2 and PE3 perform a database write for each tuple received from PE1 and generate a tuple of <name, department, salary> sent to PE4. Once received, PE4 accesses a third-party web service and generates a tuple sent further downstream in the stream application.

Figure 5:
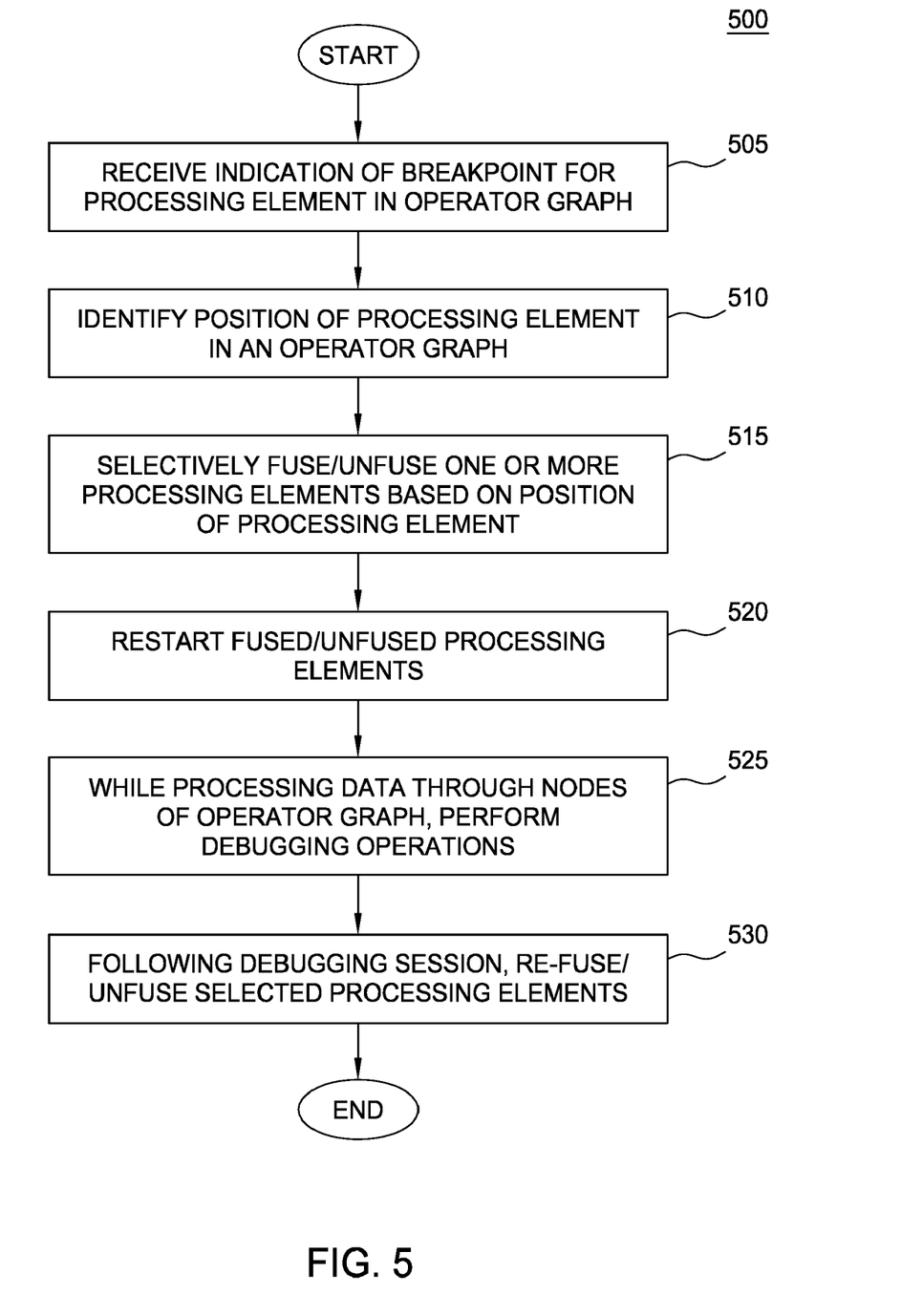
FIG. 5 illustrates a method for debugging a processing element in a stream database application, according to one embodiment of the invention.

FIG. 5 illustrates a method 500 for debugging a processing element in a stream database application, according to one embodiment of the invention. As shown, the method 500 begins at step 505, where a debugger application receives an indication of a breakpoint for a processing element included in an operator graph of a stream application. At step 510, the debugger application may identify a position of the processing element in the operator graph, relative to other processing elements. Based on the position, the debugger application may determine to fuse (or un-fuse) processing elements in the operator graph (step 515). Additionally, the debugging application may make other changes to the operation of the stream application, e.g., by duplicating a processing element with the breakpoint or exempting certain data tuples (or data flows) from being debugged. Similarly, the debugging application could specify that certain processing elements should be blocked from sending (or receiving) data tuples or should load shed the results of data processing generated during a debugging session.

At step 520, any PEs that has been fused or un-fused may be restarted and deployed to the application stream (including the PE with the breakpoint). At step 525, once the PEs are running in the application stream (and any other changes the debugger selected to make to the stream application), the operations of the PE under debug may be evaluated. For example, the PE under debug may halt execution when a breakpoint is triggered, allowing a developer to then execute the PE in a step-wise manner by stepping into (or over) function calls, to inspect variables and to perform any other debugging functions to evaluate the processing element. At the same time, data tuples continue to flow to the PE being debugged and may be stored in a buffer. That is, tuples flowing to the PE being debugged may be buffered once a breakpoint is triggered until the PE resumes execution.

At step 530, once the debugging session is complete, the debugging application may restore the state of the stream application, undoing any changes made to support the debugging session. Accordingly, PEs fused (or un-fused) as part of the debugging session may be un-fused (or re-fused), tuple flows may be restored or buffered data results may be load shed, duplicated processing elements may be removed, etc.

Figure 6:
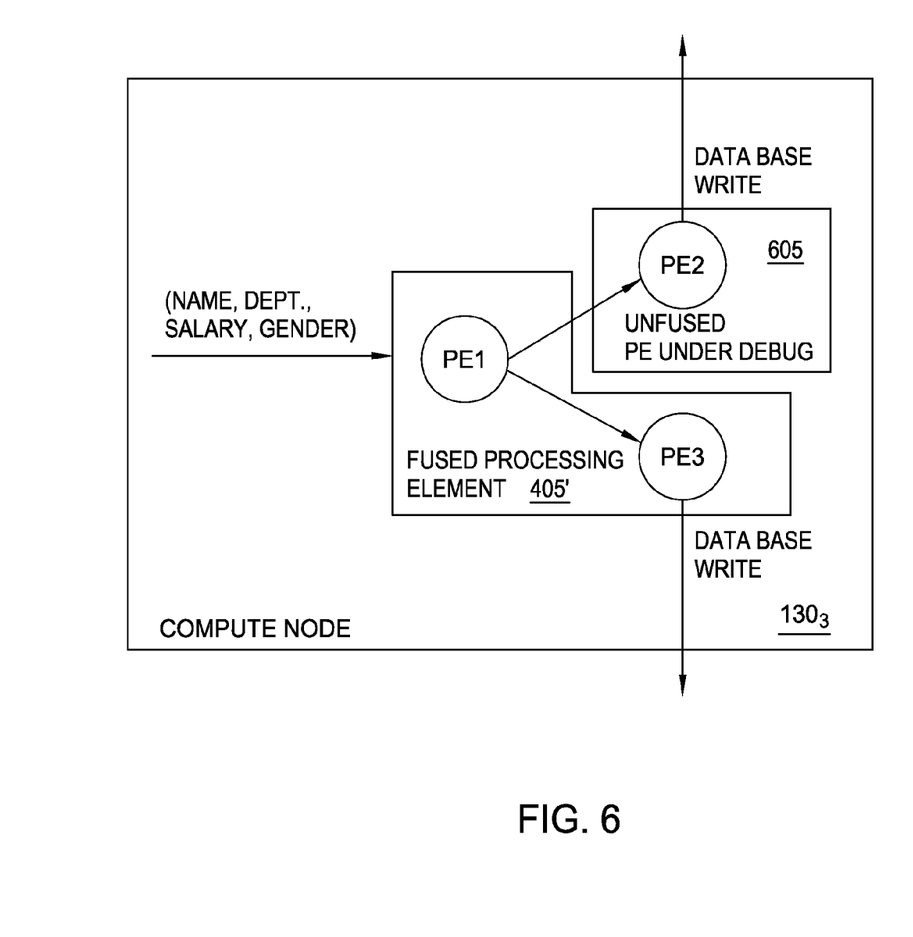
FIGS. 6-8 provide examples of the compute nodes and stream application first shown in FIG. 4 modified to illustrate scenarios for debugging the stream application, according to embodiments of the invention.
Figure 7:
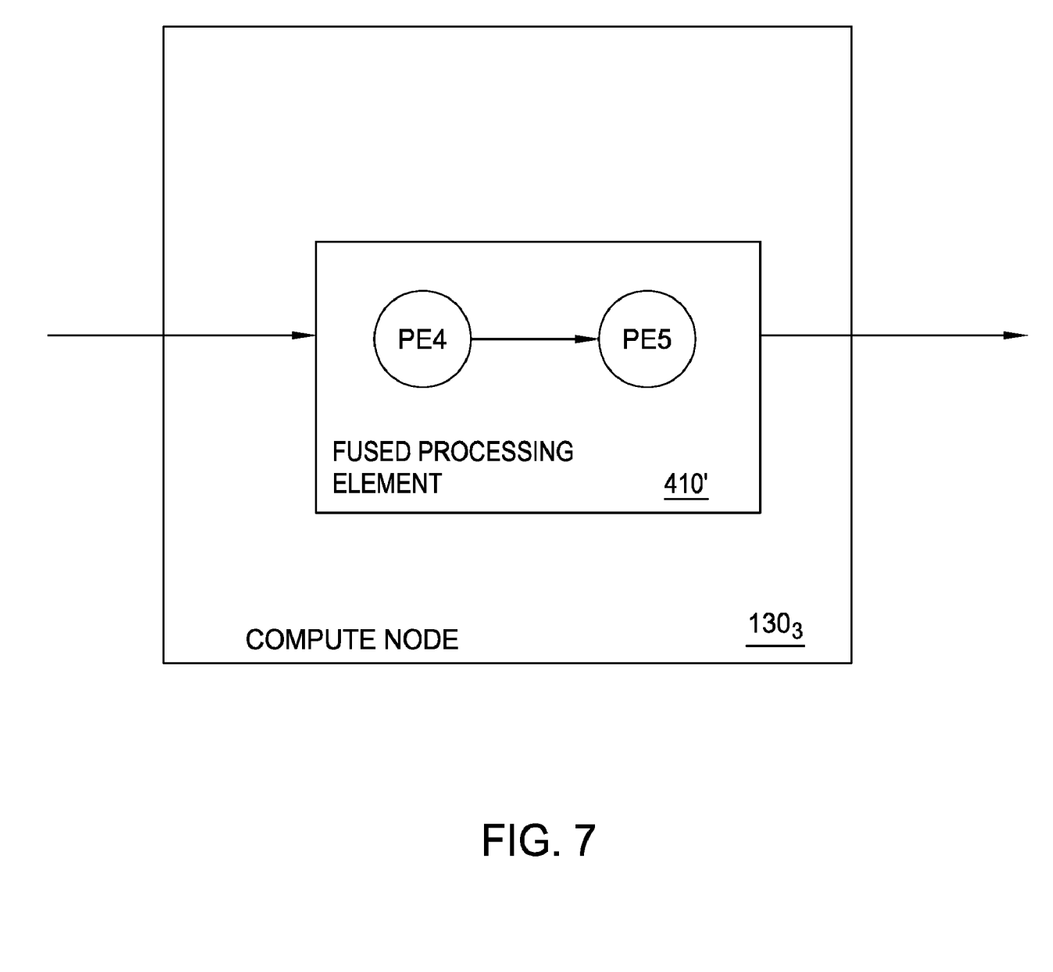
Figure 8:
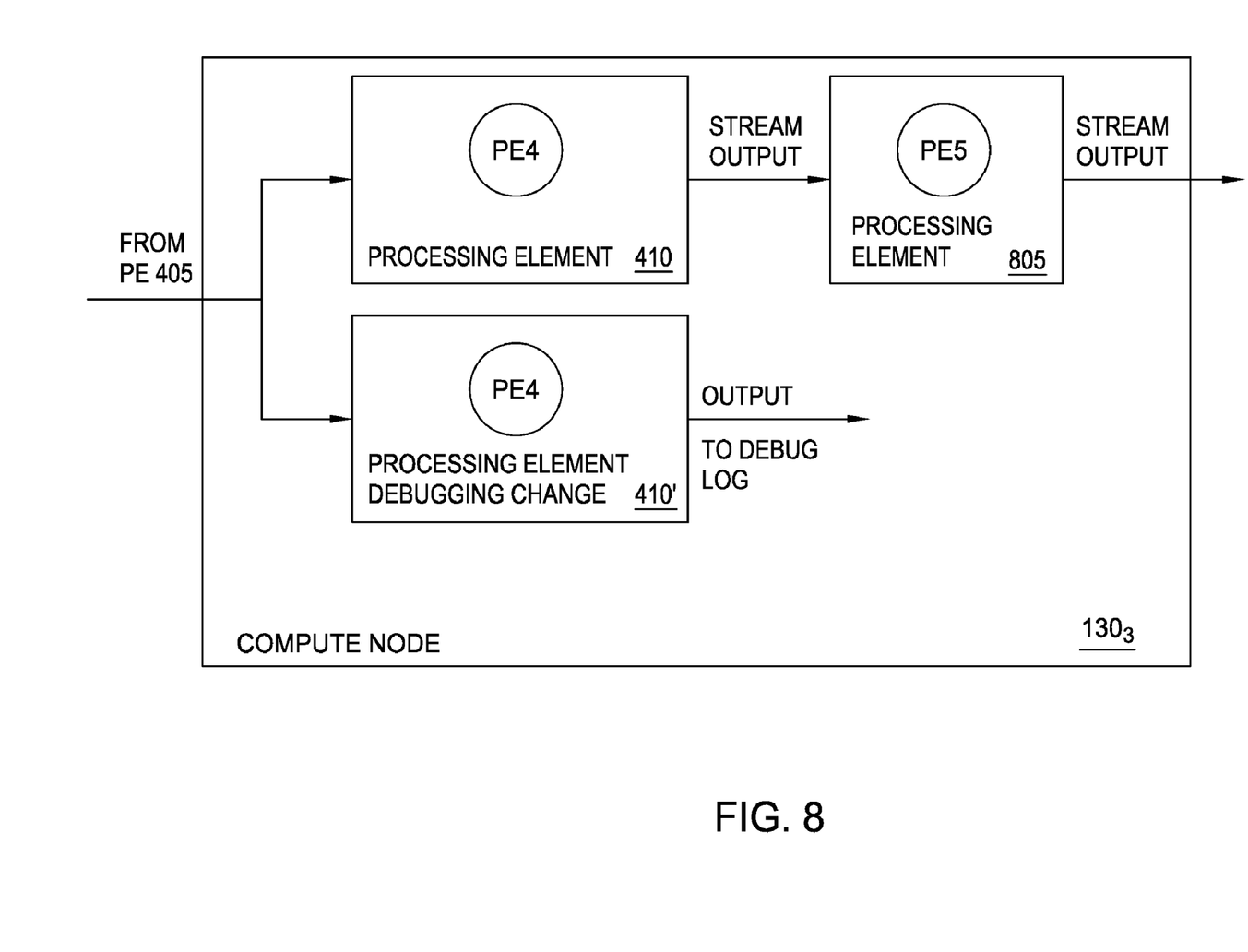

FIG. 6-8 provide examples of the compute nodes and stream application first shown in FIG. 4 modified to illustrate scenarios for debugging the stream application, according to embodiments of the invention. First, FIG. 6 illustrates an example of the fused processing element 405 of FIG. 4 after being partially un-fused to allow one of the processing elements to be debugged. Assume that a developer adds one or more breakpoints in PE2. In such a case, the debugger application could determine that PE2 can be debugged independently from the processing performed by PE1 and PE3 and un-fuse PE2 from the fused processing element 405. Accordingly, as shown, fused PE 410 has been modified to remove PE2, resulting in partially un-fused PE 405'. Additionally, PE2 is now executing as un-fused PE 605. Running PE2 as an independent process allows PE2 to be debugged without slowing down the application stream as data tuples flow through partially un-fused PE 405'. At the same time, the basic structure of the operator graph remains unchanged; tuples still flow first to PE1, which generates tuples sent to PE2 and PE3.

Similarly, FIG. 7 illustrates an example of the processing element 410 of FIG. 4 after being fused with additional PEs. In this example, assume a user places a breakpoint in PE4. In such a case, the debugger application could determine that a downstream processing element (PE5) has a dependency such that if PE4 stops executing, then PE5 should stop executing as well. For example, PE5 may be configured to receive data from PE4 at regularly specified intervals. Given this dependency, when the user inserts a breakpoint in PE4, the debugger application may fuse PE4 and PE5 into a fused processing element 410'. Doing so allows PE4 to be debugged without disrupting the operations of PE5, as when the breakpoint is hit in PE4, the operations of both PE4 and PE5 stop executing.

FIG. 8 illustrates another example of modifying the processing element 410 of FIG. 4. In this example, a user again places a breakpoint in PE 410 (labeled PE4). However, in this case assume that the debugger application determines that debugging PE 410 should not disrupt data flowing through the stream to PE 805 (labeled PE5). In such a case, the debugger application could create debug clone 410' and insert it into the application stream. This result is shown in FIG. 8, where the data flowing from PE 405 is duplicated and sent to both PE 410 and debug clone 410'. Thus, PE 410 continues to process the stream and emit tuples into the stream received by the PE 805. At the same time, data flowing from PE 405 is also sent to debug clone 410 and outputs tuples to a debug log. Doing so allows the debugger to run a debugging session for PE 410' without disrupting the application stream.

Advantageously, embodiments of the invention described above provide techniques for debugging a processing element (or elements) in a stream based application. In particular, embodiments of the invention provide techniques for debugging a processing element in a manner that reduces the impact of debugging the processing element (or elements) on the overall running environment by selectively fusing (or un-fusing) processing elements running on a group of compute nodes. In addition to fusing and un-fusing processing elements, a debugging application and stream manager may modify data flows within the application stream in a variety of ways to minimize any disruption resulting from a debugging session.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of debugging a stream application composed from a plurality of processing elements executing on one or more compute nodes, wherein the plurality of processing elements are included in an operator graph of the stream application, the method comprising:
   receiving an indication of a location for a debugging breakpoint in a first processing element of the plurality of processing elements;
   evaluating the operator graph to identify a position of the first processing element of the stream application relative to one or more other processing elements of the plurality of processing elements of the stream application;
   modifying a state of the stream application to allow the first processing element of the stream application to be debugged by performing debugging support changes including at least one of: (i) a fusing operation of the stream application, (ii) an un-fusing operation of the stream application, and (iii) a cloning operation of the stream application;
   initiating a debugging session for the first processing element of the stream application; and
   subsequent to the debugging session of the first processing element of the stream application, restoring the state of the stream application by undoing the debugging support changes.

2. The method of claim 1, wherein each processing element executes as a computing process that is allocated a process ID (PID) on a given one of the one or more compute nodes.

3. The method of claim 1, wherein the first processing element of the stream application is configured to receive a first N-tuple, process the first N-tuple, and generate a second N-tuple emitted to a second processing element of the stream application.

4. The method of claim 1, wherein the cloning operation of the stream application comprises:
   generating a debug clone of the first processing element of the stream application;
   inserting the debugging breakpoint into the debug clone; and
   inserting the debug clone into the stream application.

5. The method of claim 1, wherein the fusing operation of the stream application comprises:
   halting execution of at least a second processing element of the stream application;
   generating a fused processing element from the first processing element of the stream application and the second processing element of the stream application;
   inserting the debugging breakpoint into the fused processing element; and
   inserting the fused processing element into the stream application.

6. The method of claim 1, wherein the un-fusing operation of the stream application comprises:
   halting execution of a fused processing element including the first processing element of the stream application and a second processing element of the stream application;
   generating a first un-fused processing element that includes the first processing element of the stream application;
   inserting the debugging breakpoint into the first un-fused processing element;
   generating a second un-fused processing element that includes at least the second processing element of the stream application; and
   inserting the first un-fused processing element and the second un-fused processing element into the stream application.

7. A computer-readable storage medium containing a program which, when executed, performs an operation for debugging a stream application composed from a plurality of processing elements executing on one or more compute nodes, wherein the plurality of processing elements are included in an operator graph of the stream application, the operation comprising:
   receiving an indication of a location for a debugging breakpoint in a first processing element of the plurality of processing elements;
   evaluating the operator graph to identify a position of the first processing element of the stream application relative to one or more other processing elements of the plurality of processing elements of the stream application;
   modifying a state of the stream application to allow the first processing element of the stream application to be debugged by performing debugging support changes including at least one of: (i) a fusing operation of the stream application, (ii) an un-fusing operation of the stream application, and (iii) a cloning operation of the stream application;
   initiating a debugging session for the first processing element of the stream application; and
   subsequent to the debugging session of the first processing element of the stream application, restoring the state of the stream application by undoing the debugging support changes.

8. The computer-readable storage medium of claim 7, wherein each processing element executes as a computing process that is allocated a process ID (PID) on a given one of the one or more compute nodes.

9. The computer-readable storage medium of claim 7, wherein the first processing element of the stream application is configured to receive a first N-tuple, process the first N-tuple, and generate a second N-tuple emitted to a second processing element of the stream application.

10. The computer-readable storage medium of claim 7, wherein the cloning operation of the stream application comprises:
    generating a debug clone of the first processing element of the stream application;
    inserting the debugging breakpoint into the debug clone; and
    inserting the debug clone into the stream application.

11. The computer-readable storage medium of claim 7, wherein the fusing operation of the stream application comprises:
    halting execution of at least a second processing element of the stream application;

generating a fused processing element from the first processing element of the stream application and the second processing element of the stream application;

inserting the debugging breakpoint into the fused processing element; and inserting the fused processing element into the stream application.

12. The computer-readable storage medium of claim 7, wherein the un-fusing operation of the stream application comprises:

halting execution of a fused processing element including the first processing element of the stream application and a second processing element of the stream application;

generating a first un-fused processing element that includes the first processing element of the stream application;

inserting the debugging breakpoint into the first un-fused processing element;

generating a second un-fused processing element that includes at least the second processing element of the stream application; and inserting the first un-fused processing element and the second un-fused processing element into the stream application.

13. A system, comprising:

a plurality of compute nodes, each comprising a processor and a memory, wherein the plurality of compute nodes are configured to execute a plurality of processing elements of a stream application, and wherein the plurality of processing elements are included in an operator graph of the stream application; and a management system comprising at least a processor and a memory, wherein the memory stores a stream debugging application, which, when executed on the management system, is configured to perform an operation for debugging the stream application executing on the plurality of compute nodes, the operation comprising:

receiving an indication of a location for a debugging breakpoint in a first processing element of the plurality of processing elements, evaluating the operator graph to identify a position of the first processing element of the stream application relative to one or more other processing elements of the plurality of processing elements of the stream application, modifying a state of the stream application to allow the first processing element of the stream application to be debugged by performing debugging support changes including at least one of: (i) a fusing operation of the stream application, (ii) an un-fusing operation of the stream application, and (iii) a cloning operation of the stream application, initiating a debugging session for the first processing element of the stream application, and subsequent to the debugging session of the first processing element of the stream application, restoring the state of the stream application by undoing the debugging support changes.

14. The system of claim 13, wherein each processing element executes as a computing process that is allocated a process ID (PID) on a given one of the plurality of compute nodes.

15. The system of claim 13, wherein the first processing element of the stream application is configured to receive a first N-tuple, process the first N-tuple, and generate a second N-tuple emitted to a second processing element of the stream application.

16. The system of claim 13, wherein the cloning operation of the stream application comprises:

generating a debug clone of the first processing element of the stream application;

inserting the debugging breakpoint into the debug clone; and inserting the debug clone into the stream application.

17. The system of claim 13, wherein the fusing operation of the stream application comprises:

halting execution of at least a second processing element of the stream application;

generating a fused processing element from the first processing element of the stream application and the second processing element of the stream application;

inserting the debugging breakpoint into the fused processing element; and inserting the fused processing element into the stream application.

18. The system of claim 13, wherein the un-fusing operation of the stream application comprises:

halting execution of a fused processing element including the first processing element of the stream application and a second processing element of the stream application;

generating a first un-fused processing element that includes the first processing element of the stream application;

inserting the debugging breakpoint into the first un-fused processing element;

generating a second un-fused processing element that includes at least the second processing element of the stream application; and inserting the first un-fused processing element and the second un-fused processing element into the stream application.

* * * * *